United States Patent [19]

McManus et al.

[11] Patent Number: 4,670,780
[45] Date of Patent: Jun. 2, 1987

[54] METHOD OF MATCHING HARDCOPY COLORS TO VIDEO DISPLAY COLORS IN WHICH UNREACHABLE VIDEO DISPLAY COLORS ARE CONVERTED INTO REACHABLE HARDCOPY COLORS IN A MIXTURE-SINGLE-WHITE (MSW) COLOR SPACE

[75] Inventors: Paul A. McManus, Sherwood; Gregory L. Hoffman, Beaverton, both of Oreg.

[73] Assignee: Tektronix, Inc., Beaverton, Oreg.

[21] Appl. No.: 737,765

[22] Filed: May 28, 1985

[51] Int. Cl.⁴ .................. G03F 3/08; H04N 1/46
[52] U.S. Cl. .................................. 358/80; 358/75
[58] Field of Search ............. 358/80, 75, 75 IG, 78, 358/76

[56] References Cited

U.S. PATENT DOCUMENTS

| | | | |
|---|---|---|---|
| 4,127,871 | 11/1978 | Sakamoto | 358/80 |
| 4,334,240 | 6/1982 | Franklin | 358/80 |
| 4,335,399 | 6/1982 | Matsumoto | 358/80 |
| 4,393,398 | 7/1983 | Horiguchi et al. | 358/80 |
| 4,409,614 | 10/1983 | Eichler et al. | 358/80 |
| 4,425,417 | 1/1984 | Ingalls et al. | 430/30 |
| 4,458,265 | 7/1984 | Yoshida et al. | 358/80 |
| 4,468,692 | 8/1984 | Yamada et al. | 358/80 |
| 4,477,833 | 10/1984 | Clark et al. | 358/80 |
| 4,481,532 | 11/1984 | Clark et al. | 358/80 |
| 4,482,917 | 11/1984 | Gaulke et al. | 358/80 |
| 4,558,356 | 12/1985 | Toda et al. | 358/80 |
| 4,564,859 | 1/1986 | Knop et al. | 358/80 |
| 4,614,967 | 9/1986 | Sayanagi | 358/75 |

FOREIGN PATENT DOCUMENTS

10251 1/1985 Japan ........................... 358/80

OTHER PUBLICATIONS

Peter G. Engeldrum, "Four Color Reproduction Theory for Dot Formed Imaging Systems", 11/84, *Second International Congress on Advances in Non-Impact Printing Technologies*, 6 pages.

*Primary Examiner*—James J. Groody
*Assistant Examiner*—Randall S. Svihla
*Attorney, Agent, or Firm*—Francis I. Gray; Robert S. Hulse

[57] ABSTRACT

A method for matching hardcopy colors to display colors for registered-dot ink-jet copiers. Video RGB (red-green-blue) is converted into chromaticity coordinates in XYZ color space. An explicit solution is achieved by defining a new MSW color space which restricts the hardcopy colors to some percentage of one of the binary mixtures (M) of inks, some percentage of one of the single (S) inks, and some percentage of paper white (W). The color data in XYZ space is converted to MSW space and unreachable display colors are mapped into reachable hardcopy colors. Correction for hardcopy non-linearities is accomplished by using coverage ratios to correct for color shifts due to interaction among the inks. The MSW values are then converted to CMY (cyan-magenta-yellow) values which are processed in accordance with an appropriate dithering algorithm for conversion into dots for printing on paper.

4 Claims, 4 Drawing Figures

METHOD OF MATCHING HARDCOPY COLORS TO VIDEO DISPLAY COLORS IN WHICH UNREACHABLE VIDEO DISPLAY COLORS ARE CONVERTED INTO REACHABLE HARDCOPY COLORS IN A MIXTURE-SINGLE-WHITE (MSW) COLOR SPACE

BACKGROUND OF THE INVENTION

1. Field of the Invention

The present invention relates to transformation of a color image from one color space to another, and more particularly to an efficient algorithm for performing the transformation of color of known composition in terms of the intensities of video red, green and blue phosphors into the necessary densities of cyan, magenta, yellow and black inks, as deposited by a display device, to yield a visual match between the color so produced on hardcopy and the video color.

2. Description of the Prior Art

There are situations where a hardcopy of a color video display should match that display in color. Two examples are renderings of digitized photographs and proofing copies for a graphic artist's work station, and it is considered by people working in hardcopy technology that a color match is desirable generally.

The defining data can have a number of different forms. Images taken from photographic sources exist as values in RGB (red-green-blue), based upon a set of color separation filters which may or may not be clearly defined. Images generated originally on a graphics display exist as values in the RGB drive intensities for the set of phosphors, such as a NTSC standard phosphor set, used in creating them, the parameters of which set may or may not be known. Images generated by a computer are based on an arbitrary set of RGB definitions which may or may not be known. Thus no single set of primaries can be defined for all the needed transformations.

For a video display, color is produced by adding light from the various phosphors, while for a hardcopy device, color is produced by subtracting light via the inks used. The result is that, for example, the display red is not the same as the hardcopy red. In FIG. 1 the particular gamuts of a particular video display (phosphor set) and a particular ink and paper system are shown. The diagram shows that there are large areas of union between the two gamuts, but there are also non-neglible areas of disunion. If a color from the video gamut is not within the hardcopy gamut, i.e., unreachable, it has to be represented by a color that is within the hardcopy gamut. All unreachable colors may be collapsed to the closest reachable color, which throws away discriminability; the video gamut may be limited so no color is specified that cannot be matched, which is probably unacceptable; the larger gamut may be compressed into the smaller one through some sort of scaled mapping, which discards the possibility of a match entirely; or some reachable color may be substituted for any unreachable one, while endeavoring to match all reachable ones as accurately as possible. What is desired is a way to implement the latter choice by reducing the lightness, i.e., the normalized brightness, partly down to a point at which the chroma can be reached, and then reducing the chroma until the lowered lightness can be reached.

However, even if the primary colors are matched, the whites are not. The video white is normally very different in chromaticity from a white copy sheet viewed under usual room lighting. In terms of correlated color temperature the video white is likely to lie between 6500 and 9500 degrees Kelvin, while that of the sheet is easily under 4000 degrees Kelvin. In visual terms, the video white is quite blue relative to the white of the sheet. It is not desirable to have the white areas of an image rendered as a robin's-egg blue in the copy.

There is a phenomenon that has relevance to the above problem: if a person looks at a colored picture under bright, indirect sunlight, and then at the same picture under only incandescent lighting, the correlated color temperature change in the light sources is from 6500 degrees Kelvin down to 2600 degrees Kelvin. The white areas in the picture do not look robin's-egg blue outdoors, nor do they look canary yellow indoors, although that is approximately the magnitude of the colorimetric change in those areas for the two conditions. This phenomenon is akin to color constancy, i.e., over a broad range a person continuously redefines white as some kind of average over all areas in view.

What is desired is a method for weighting the intensities of the phosphor primaries so that when combined in even levels, and evaluated with color matching functions, they yield the chromaticity coordinates of the neutrals to which they are to be matched, rather than the actual coordinates of the video white.

With respect to the hardcopy device, present ink-jets do not afford control of dot size. Thus half-toning, used to produce color in the printing industry, cannot be done with ink-jets. Fractional areas coverage, for a particular ink, is only achieved by defining some number of addressable points, normally a square array, and then determining at how many of them to place a dot. This is done by developing a square array of numbers with the same number, N, of elements per side as the array of addressable points to be used. The array of numbers contains every number from 0 to $(N^{**}2)-1$, and the numbers are positioned in the array so that as the pattern is filled the dots on paper are as uniformly distributed as possible.

A fixed relationship is established between the numeric array and addressable points. At each addressable point the fractional area coverage desired is obtained for each ink, the value is multiplied by $N^{}2$, the product is rounded, and the result is added to the array number corresponding to the particular addressable point. If the sum is greater than $(N^{}2)-1$, a dot is printed at that point, otherwise not. This results in optimum shading of the paper, in preservation of the maximum contrast edges at the full resolution of the system, and in correct location and continuity of the lower contrast edges though with increasing loss of acutance as contrast is lower. When placement has been determined for the ink dots, the resulting color is calculated by a method analogous to that used for the phosphor outputs. The contributions for each surface color are weighted by the fractional area it covers since there is no variation in intensity. However, the ink dots cover more than the addressable points, and therefore there is more color than desired. This implies that a correction for oversized dots must be performed to get a good color match.

SUMMARY OF THE INVENTION

Accordingly, the present invention provides a color transformation algorithm for matching hardcopy color to display color to take account both of the limitations of video color and of the imperfect character of the colorants in the inks used. The video red-green-blue (RGB) is normalized and converted into chromaticity coordinates in XYZ color space. The hardcopy system is reduced to a well-behaved mixture-single-white (MSW) system which can be solved explicitly by restricting the hardcopy colors to some percentage of one of the binary mixtures of inks, some percentage of one of the single inks, and some percentage of copy white. The data in XYZ color space is converted to this MSW space. Unreachable colors are mapped into reachable colors. Correction for hardcopy non-linearities is accomplished by distorting the calculated ink amounts using a function derived from measurement of the dot characteristic. A coverage ratio is used to correct for color shifts. The result is cyan-magenta-yellow (CMY) values representing the hardcopy color which matches the video color. For copiers requiring an RGB input, the bits of the CMY values are complemented. The resulting color is sent to a dithering algorithm to convert these percentages into dots on paper.

The objects, advantages and novel features of the present invention will be apparent from the following detailed description when read in conjunction with the appended claims and attached drawings.

DESCRIPTION OF THE PREFERRED EMBODIMENT

Figure 1:
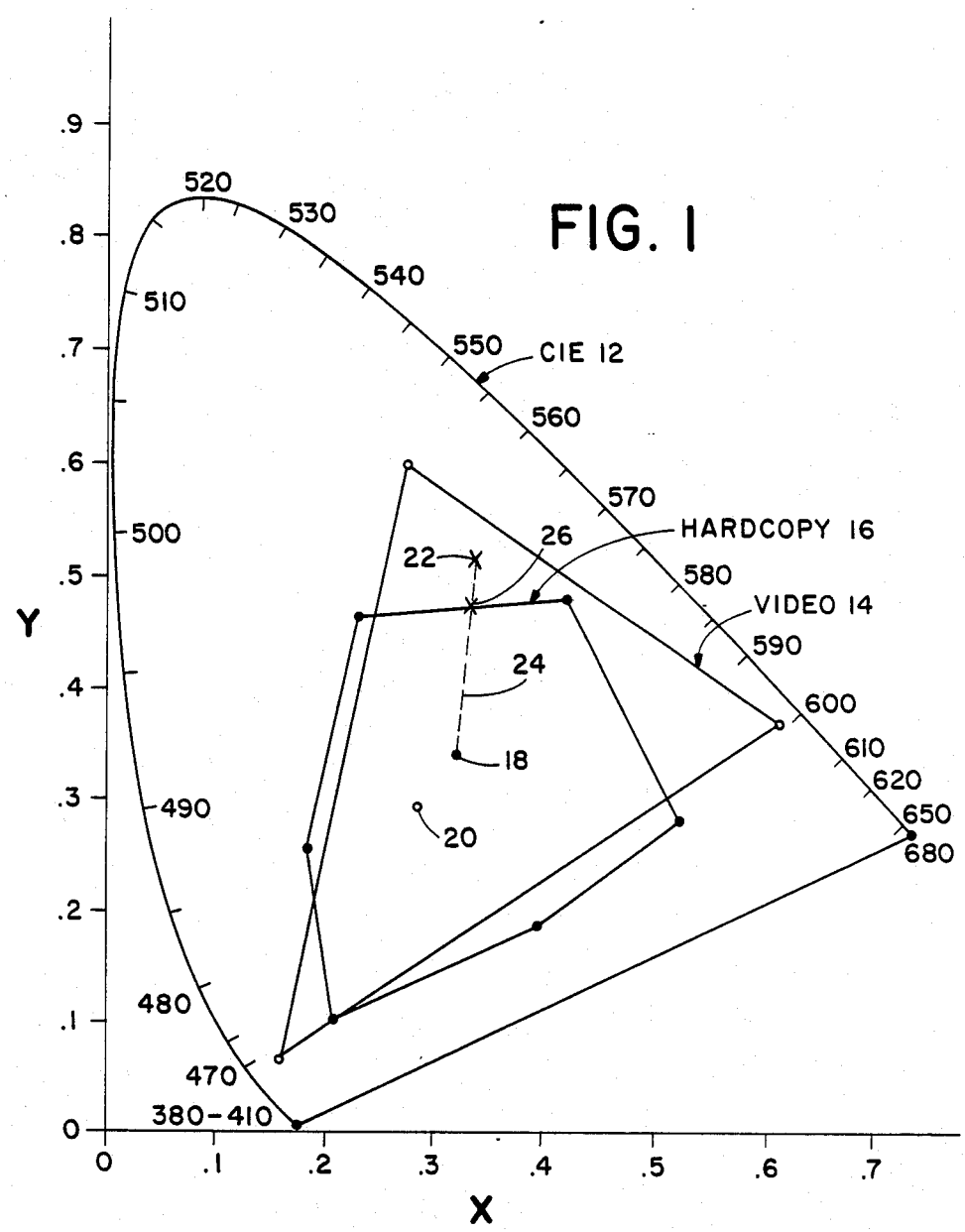
FIG. 1 is a plot of the comparison of a video display gamut and a hardcopy gamut in a CIE (XYZ) chromaticity space.
Figure 2:
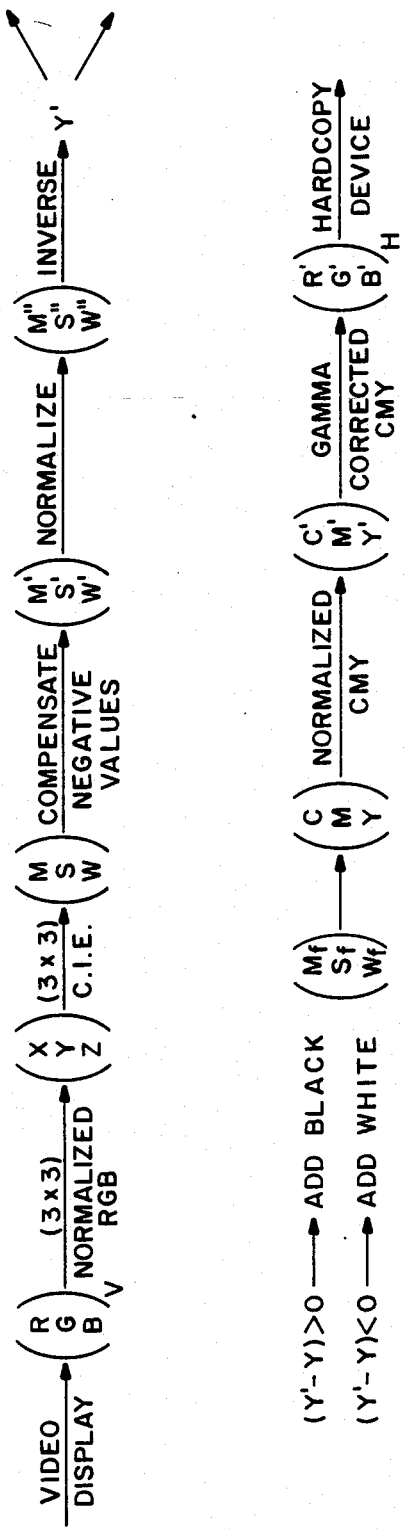
FIG. 2 is a flow chart showing the sequence of events for matching video color and hardcopy color.
Figure 3A:
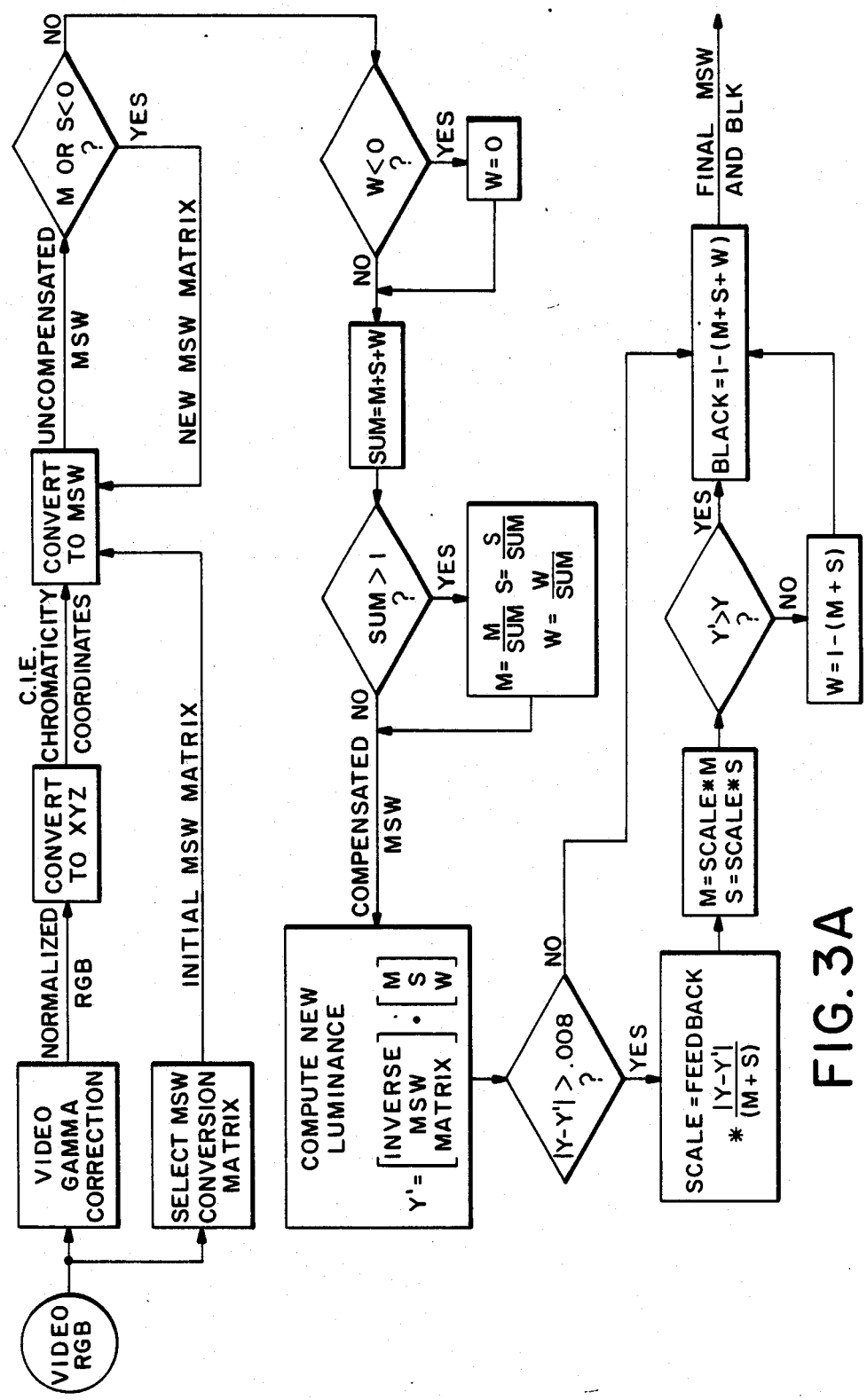
FIGS. 3a and 3b are a block diagram flow chart for matching video color and hardcopy color corresponding to FIG. 2.
Figure 3B:
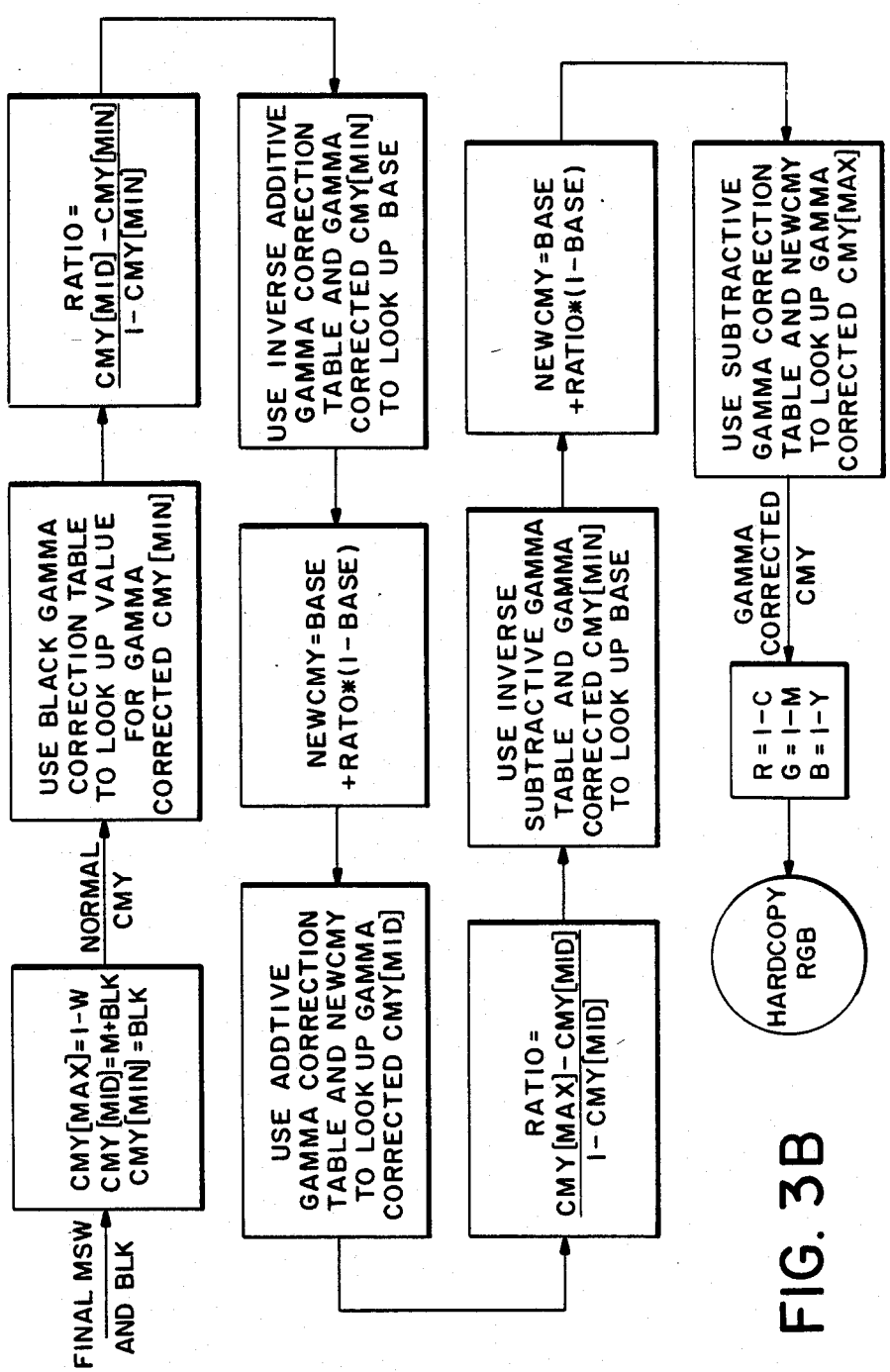

Referring now to FIGS. 2, 3a and 3b, the first step in matching hardcolor copy is to convert the video RGB data from the color map of a display device into a standard C.I.E., or XYZ, space. To define a given color using three primary colors, such as red, green, blue, the value of one of the primaries may be negative. The Commission International de L'Eclairage (CIE), or International Commission on Illumination, in 1931 defined a transformation so that in a new color coordinate system all the components X, Y, and Z have positive values. The C.I.E. diagram, as shown in FIG. 1, is a generally horseshoe-shaped spectrum locus 12 in a plane Cartesian XY coordinate system on which points representing the chromaticities of the spectrum colors are plotted according to their wavelengths in nanometers. The Z-axis, orthogonal to the XY plane, determines the luminance of the color. A triangle 14 represents the video display gamut, i.e., the colors which can be displayed by a particular three primary color system, such as the NTSC phosphor-set commonly used for color video display devices. An irregular polygon 16 represents the colors which can be displayed by a hardcopy device, such as an ink-jet printer with cyan-magenta-yellow (CMY) and black inks and a particular paper.

The RGB data is in the form of n-bit words from the color map of the video display, i.e., an integer value between 0 and $(2^{**}n)-1$. This data is normalized to a range of 0–1.0 with compensation for the video gamma.

As is shown in FIG. 1, the hardcopy, or paper, white 18 is not the same as the video display white 20. Therefore, the video display white 20 when mapped into the XYZ color space and then converted to the hardcopy produces a greenish color. Thus, the conversion from RGB space to XYZ space first involves weighting the conversion matrix so that the video and hardcopy whites are coincident, i.e., unit values of RGB in video white are treated as though they produced paper white to insure that neutral colors on the video display print as neutral colors on the hardcopy device. Now the data is converted from RGB space to XYZ space via a 3×3 matrix multiplication:

$$[A]^*[R,G,B]=[X,Y,Z] \qquad (1)$$

where the parameters of the matrix multiplier A are based upon measured data for the particular phosphor set as weighted to produce white coincidence.

To convert from XYZ space to the hardcopy space involves eight unknowns, namely the three components of RGB space, the three components of CMY space, white and black. A set of Neugebauer equations for XYZ space are:

$$X = K_{1c}C + K_{1m}M + K_{1y}Y + K_{1r}R + K_{1g}G + K_{1b}B + K_{1w}W$$
$$Y = K_{2c}C + K_{2m}M + K_{2y}Y + K_{2r}R + K_{2g}G + K_{2b}B + K_{2w}W \qquad (2)$$
$$Z = K_{3c}C + K_{3m}M + K_{3y}Y + K_{3r}R + K_{3g}G + K_{3b}B + K_{3w}W$$

However, in a registered-dot ink-jet hardcopy device combination colors (RGB) are formed by the superposition of two of the CMY components on top of each other. Therefore, if the dominant hue of a particular color is, for example, green, the R and B components can be ignored. Likewise, if the greenish color is more blue than yellow, then the M and Y components also can be ignored. This reduces the set of Neugebauer equations to:

$$X = K_{1c}C + K_{1g}G + K_{1w}W \qquad (3)$$
$$Y = K_{2c}C + K_{2g}G + K_{2w}W$$
$$Z = K_{3c}C + K_{3g}G + K_{3w}W$$

Thus, by restricting the choices to the most likely choice of RGB and the most likely choice of CMY, the Neugebauer equations are reduced to a set of three equations with three unknowns and can be solved explicitly rather than iteratively. Since the RGB component is a mixture (M) of two of the CMY components, the CMY component is a single (S) color, and white (W) remains, this new color space is referred to as the MSW space, and $$[X,Y,Z]=[K]^*[M,S,W] \qquad (4)$$

or $$[M,S,W]=[K]^{-1*}[X,Y,Z] \qquad (5)$$

The next step is to convert the XYZ color space to the MSW color space. There are six possible combinations of the RGB components:

$$R \geq G \geq B$$

-continued $$R \geq B \geq G$$
$$G \geq R \geq B$$
$$G \geq B \geq R$$
$$B \geq R \geq G$$
$$B \geq G \geq R$$

Based upon the relative magnitudes of red, green and blue in the video display data, an initial one of the six possible color correction matrices is selected to perform the conversion. Thus, each color correction matrix corresponds to some region of RGB values. For colors near the borders of these regions the initial matrix selection may be incorrect, which leads to negative values in the mixed or single components. Since a "negative" dot cannot be printed, the useful solution consists only of positive values. When a negative value occurs, the next closest matrix is selected and the XYZ to MSW conversion is performed again. Most of the time the initial matrix yields all positive values for the mixed and single components. Using these all-positive values, black is determined by the difference between a unit area and the mixed, single and white areas:

$$Black = 1.0 - M - S - W \qquad (7)$$

Since the conversion from XYZ space to MSW space involves a 3×3 matrix multiplication, $$[B]*[X,Y,Z] = [M,S,W] \qquad (8)$$

and the conversion from RGB space to XYZ space also involves a 3×3 matrix multiplication, a direct conversion from RGB space to MSW space may be used:

$$[A]*[B]*[R,G,B] = [M,S,W] \qquad (9)$$

However, since both RGB space and MSW space are referenced to a common XYZ space, the XYZ space serves to isolate the video color world from the hardcopy color world. Also, as is discussed infra, XYZ space is used to restore any differentiation or discriminability that may be lost.

If the white component of MSW space is negative, the requested color is too saturated and cannot be reproduced on the hardcopy. The negative white values are set equal to zero. This is equivalent to an unreachable color 22 which exists within the video color gamut 14, but outside the hardcopy color gamut 16. The zeroing of the white acts to pull the color in along a line 24 connecting the hardcopy white 18 to the unreachable video color 22 until the perimeter 26 of the hardcopy color gamut 16 is attained. This line 24 is called the dominant wavelength of the color, and the dominant wavelength of the color is maintained while its saturation is decreased.

After all negative values have been corrected, the corrected, or compensated, MSW components [M',S',W'] are summed. If the sum exceeds 1.0, the requested color is brighter than the hardcopy device can achieve under the illuminant selected. In this situation the components are normalized by dividing each component by the sum, making the sum of the components less than 1.0. Now the resulting MSW components [M'',S'',W''] is a reachable color for the hardcopy device. However, because of the above compensations for the unreachable colors, colors which are different in color or brightness on the video display are matched as the same color on the hardcopy device.

Therefore, the next step is to restore the shading or edge between adjacent colors, i.e., the distinction between adjacent colors. This is accomplished by calculating a new Y component (Y') for the MSW space by using the inverse matrix of the XYZ to MSW conversion matrix:

$$[A^{-1}]*[M'',S'',W''] = [X',Y',Z'] \qquad (10)$$

Then the quantity (Y'-Y) is calculated. If Y'=Y, then there is an exact match of the hardcopy and video colors, i.e., the color is within the coincident portion of the respective gamuts. If Y' is greater than Y, resulting from the correction for the negative white, then black is added by computing a scale factor, based on the difference between Y and Y', and applying the scale factor to the mixed and single components. Black is the remainder when MSW components are subtracted from 1.0, generally given as follows:

$$Black = 1.0 - (M_f + S_f + W_f) \qquad (11)$$

wherein for this specific case $W_f$ by definition is zero since white was negative. This has the effect of adding black ink to pull the brightness down. If Y' is less than Y, resulting from the component sum being greater than 1.0, white is added by calculating a scale factor, based upon the difference between Y and Y', to be applied to the mixed and single components. The white component is then set equal to the remaining area after the mixed and single component is subtracted out:

$$W_f = 1.0 - (M_f + S_f) \qquad (12)$$

While the previous two steps, equations (10) and (11), preserve the luminance differences between unreachable colors at the expense of chromaticity matches, this step increases the luminance of the color while decreasing its saturation. The final MSW vector has components which match the color exactly where the video and hardcopy gamuts are coincident, which match the color to a reachable color if the color is within the video gamut but outside the hardcopy gamut, and which match the color into colors which preserve the difference between colors.

The next step is to determine what inks to put down on the paper, i.e., convert the MSW components into CMY components. The assignment of values for the inks depends upon the particular MSW conversion matrix used. One of the inks, the single component such as the cyan (C) shown in equations (3), appears everywhere ink is laid down. The value of this ink is:

$$C_{max} = 1.0 - W_f \qquad (13)$$

A second ink occurs in both the mixed component and black and has a value:

$$C_{mid} = B_f + M_f \qquad (14)$$

where $B_f$ is the black. The mixture of $C_{max} + C_{mid}$ produces the mixed component shown as green (G) in equations (3). The third ink appears only in the black:

$$C_{min} = B_f \qquad (15)$$

The CMY values $C_{max}$, $C_{mid}$ and $C_{min}$ represent the percentages of each ink to be used for a given color for a registered-dot ink-jet hardcopy device, i.e., where the mixed and black components are formed by overlaying dots of ink on top of each other.

These CMY percentages do not represent a uniformly applied amount of ink with variable optical density, but rather the fraction of discrete drops to be deposited over some area of the paper. The correct color sensation is produced because the visual system averages this pattern of dots. Because the ink dots overlap, this visual sensation is not linear with the number of dots in the pattern. To handle this irregularity the CMY values are used as indices to hardcopy gamma correction lookup tables, based upon measurements containing new values which compensate for the system irregularities. Since black is usually a separate ink rather than a combination of the three color inks, a black gamma correction table is used to compensate for $C_{min}$.

For $C_{mid}$ two difficulties arise. First, when $C_{max}$ and $C_{mid}$ are combined, the amount of dot overlap is different due to the wetting of the paper surface by the first ink laid down. This results in a gamma correction characteristic of the binary mixture which differs from the gamma correction characteristics for the individual inks. Therefore, $C_{mid}$ is processed using a mixture gamma correction table (red, green or blue) rather than a single ink gamma correction table. Second, the prior gamma correction of $C_{min}$ leads to noticeable shifts since after gamma correction through their respective tables the percentage coverage of $C_{mid}$ by $C_{min}$ changes. To avoid this problem a coverage ratio is computed from the original, uncorrected values as:

$$C.R. = (C_{mid} - C_{min})/(1 - C_{min}) \quad (16)$$

The gamma corrected value of $C_{min}$ is then used as an index to the inverse of the $C_{mid}$ gamma correction table to yield a base value. A corrected value for $C_{mid}$ is then computed as:

$$C_{mid} = \text{base} + (C.R.)*(1-\text{base}) \quad (17)$$

As an example, if the value for $C_{mid}$ is $\frac{1}{2}$ and for $C_{min}$ is $\frac{1}{4}$, then 50% of the $C_{mid}$ covers $C_{min}$. Then if the gamma correction is $C_{mid} = \frac{5}{8}$ and $C_{min} = \frac{1}{8}$, now only 33% of the $C_{mid}$ covers $C_{min}$ resulting in more color than desired. The color ratio serves to restore the appropriate ratio after gamma correction.

Likewise for $C_{mid}$ and $C_{max}$:

$$C.R.' = (C_{max} - C_{mid})/(1 - C_{mid}) \quad (18)$$

$$C_{max}' = \text{base}' + C.R.'*(1-\text{base}') \quad (19)$$

Where base' is determined by inverse gamma transformation of gamma-corrected $C_{mid}$ through the appropriate CMY (single color) gamma-correction table. $C_{max}'$ is then gamma corrected through the appropriate CMY table. This produces a new CMY vector $[C',M',Y']$ which may be output to a hardcopy device, or complemented to determine a new RGB vector $[R',G',B']$ for those devices which require an RGB input. The output of the color matching algorithm is then processed by an appropriate dithering algorithm to convert the resulting color data into drops of ink on the paper.

Thus, the present invention provides a method for matching hardcopy color to video color by replacing video RGB with hardcopy RGB which compensates for the effects of video gamma, paper, and ink by use of a new MSW space, and which compensates for the ink-jet gamma by appropriately chosen gamma correction tables together with using a coverage ratio for interaction of the inks.

What is claimed is:

1. A method for matching hardcopy colors to video display colors comprising the steps of:
    transforming normalized video display color data into MSW color data where said MSW color data has a binary mixture color component, a single color component and a white color component;
    manipulating said MSW color data to convert unreachable video display color data into reachable hardcopy color data; and
    converting said manipulated MSW color data into hardcopy color data.

2. A method as recited in claim 1 wherein said converting step comprises the steps of:
    computing coverage ratios to compensate for interactions between color components of said hardcopy color data; and
    using said coverage ratios to determine new values for said color components of said hardcopy color data.

3. A method as recited in claim 1 wherein said transforming step comprises the steps of:
    transforming said normalized video display color data into XYZ color data having color components which all have positive values; and
    transforming said XYZ color data into said MSW color data.

4. A method as recited in claim 3 wherein said step of transforming said normalized video display color data into said XYZ color data comprises the step of weighting the conversion matrix to be used to transform said normalized video display color data into said XYZ color data so that whites of said video display colors and said hardcopy colors are coincident.

* * * * *